US008561096B1

(12) United States Patent
Dulac (10) Patent No.: US 8,561,096 B1
(45) Date of Patent: Oct. 15, 2013

(54) DISTRIBUTED STORAGE AND PROCESSING OF VIEWING USAGE DATA

(75) Inventor: Stephen P. Dulac, Santa Clarita, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 3813 days.

(21) Appl. No.: 10/339,002

(22) Filed: Jan. 8, 2003

(51) Int. Cl.
*H04N 7/16* (2011.01)

(52) U.S. Cl.
USPC ............................................ 725/20; 709/224

(58) Field of Classification Search
USPC ....................... 725/9–20, 131–134, 193–142, 725/151–153; 709/217–232
See application file for complete search history.

(56) References Cited

U.S. PATENT DOCUMENTS

| | | | | |
|---|---|---|---|---|
| 5,374,951 A | * | 12/1994 | Welsh | 725/20 |
| 5,544,354 A | | 8/1996 | May et al. | |
| 5,857,190 A | | 1/1999 | Brown | |
| 5,937,163 A | | 8/1999 | Lee et al. | |
| 5,964,839 A | | 10/1999 | Johnson et al. | |
| 5,991,735 A | | 11/1999 | Gerace | |
| 6,029,045 A | * | 2/2000 | Picco et al. | 725/34 |
| 6,133,912 A | | 10/2000 | Montero | |
| 6,185,514 B1 | | 2/2001 | Skinner et al. | |
| 6,298,482 B1 | * | 10/2001 | Seidman et al. | 725/46 |
| 6,330,586 B1 | | 12/2001 | Yates et al. | |
| 6,356,859 B1 | | 3/2002 | Talbot et al. | |
| 6,637,029 B1 | * | 10/2003 | Maissel et al. | 725/46 |
| 7,051,352 B1 | * | 5/2006 | Schaffer | 725/39 |
| 2003/0115587 A1 | * | 6/2003 | Kendall et al. | 725/9 |

FOREIGN PATENT DOCUMENTS

| | | |
|---|---|---|
| EP | 0524080 A3 | 1/1993 |
| WO | WO 01/02954 A1 | 1/2001 |

OTHER PUBLICATIONS

Michael Robin et al., *Digital Television Fundamentals—Design and Installation of Video and Audio Systems*, McGraw-Hill, Chapter 8, title page(s) and pp. 345-425.

* cited by examiner

*Primary Examiner* — Annan Shang (57) ABSTRACT

One or more embodiments of the invention provide a method, apparatus, and article of manufacture for processing viewing usage data in a set-top box. A set-top box (STB) receives, via broadcast, distinct programmable instructions for data collection, data manipulation, and data reporting for viewing usage data. The STB then obtains/collects raw viewing usage data in accordance with the instructions for data collection. Once collected, the STB manipulates the raw viewing usage data to create a report in accordance with the instructions for data manipulation. The report is then transmitted from the set-top box to a centralized data mining system in accordance with the instructions for data reporting.

24 Claims, 6 Drawing Sheets

DISTRIBUTED STORAGE AND PROCESSING OF VIEWING USAGE DATA

BACKGROUND OF THE INVENTION

1. Field of the Invention

The present invention relates to systems and methods for processing viewing usage data in a set top box and in particular to a method and system for the collection, storage, and processing of viewing usage data that reduces the cost of performing the function while simultaneously allowing enhanced results.

2. Description of the Related Art

The collection, storage, and processing of viewing usage data provides valuable information to a multi-channel video distributor. Through understanding its customers' viewing habits and programming preferences, a distributor can increase revenues by offering them more desirable programming and more interesting advertisements. Furthermore, other companies (such as advertisers, programming providers and television networks) are willing to pay for audience measurement data, representing additional revenue sources for the distributor.

In the past, individual "raw" viewing usage data (such as remote control clicks) would be stored on a set-top box (STB) that was pre-programmed to collect such data. This STB would often be single purposed for viewing usage data collection and would not include any television signal reception and decoding functions. This raw data was then transferred on a regular basis (e.g., a nightly telephone call) to a centralized data mining system. The centralized data mining system would have an extremely large data storage capability and data processing capability, to allow the generation of reports.

Figure 1A:
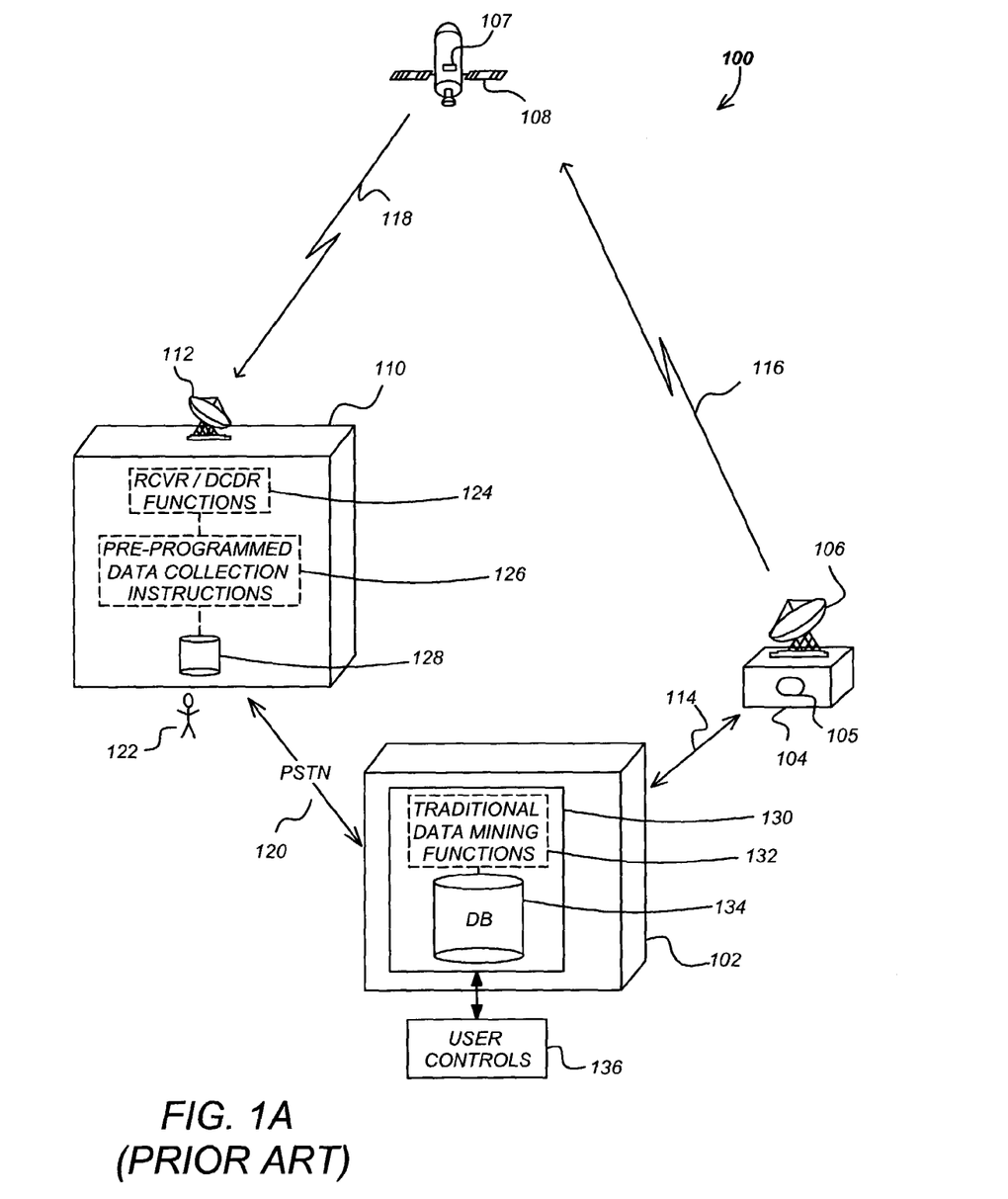
FIG. 1A is an overview of a sample architecture for a centralized viewing usage data service and a single video distribution system of the prior art.

FIG. 1 is an overview of a sample architecture for a centralized viewing usage data service and a single video distribution system 100 of the prior art. The video distribution system 100 comprises a control center 102 in communication with an uplink center 104 via a ground or other link 114 and with a subscriber receiver station 110 via a public switched telephone network (PSTN) or other link 120. The control center 102 provides program material (e.g. video programs, audio programs and data) and services to a subscriber receiver station 110 via the uplink center 104 and satellite 108.

The uplink center 104 receives program material and services from the control center 102. Uplink center 104 then multiplexes and modulates the program material and services, and using an uplink antenna 106 and transmitter 105, transmits the program material and program control information to the satellite 108. The satellite receives and processes this information, and transmits the program material and services to the subscriber receiver station 110 via downlink 118 using transmitter 107. The subscriber receiving station 110 receives this information using the outdoor unit (ODU) 112, which may include a subscriber antenna and a low noise block converter (LNB).

The subscriber receiving station 110 may include a set-top box that may be controlled by a user 122 (e.g., using a remote control). The user may then enjoy services and program material (e.g., displayed through a video monitor or other appropriate presentation device) that has been processed using receiver/decoder functionality 124 within the STB. The subscriber receiving station 110 (or STB within subscriber receiving station 110) is pre-programmed with data collection instructions 126 to collect individual "raw" viewing usage data (such as remote control clicks or channel number and date/time) from user 122. The data collected is stored in set-top box memory 128, which is often of small capacity.

The raw usage data stored in memory 128 is then transferred on a regular pre-programmed basis to a data mining system 130 located centrally (e.g., at a broadcast head end/control center 102 or at service headquarters). The data transfer may occur via telephone (e.g., PSTN 120), via a cable modem, or other high-speed connection, or via wireless methods. The centralized data mining system 130 has an extremely large data storage capability 134 and data processing capability 132. A staff responsible for viewing usage reporting operates the data mining system 130 through user control terminals 136. This staff provides data manipulation and reporting instructions to the data mining system 130, which then generates the required reports.

However, using this prior art methodology, the collection, storage and processing of audience usage data is a costly undertaking. A system for collecting the data in each viewer's home is needed, costing many hundreds of dollars per household. A method for transferring all of the raw usage data, representing thousands of bits of data per STB, to the distributor is also required. Finally, a centralized data mining system, which has large data storage and significant processing capability, is needed. Since the costs of collection and processing data is prohibitively expensive, viewing usage data systems often collect data from small subsets of the viewing population and rely on probabilistic methods to apply the results to a larger audience.

Accordingly, what is needed is an efficient and inexpensive method for collecting, storing, and processing viewing usage data for use by programming providers.

SUMMARY OF THE INVENTION

One or more embodiments of the invention take advantage of advanced functionalities available in set-top box (STB) technology. Such functionalities utilized include increased memory, increased processing performance, and re-programmability of STBs.

With these advanced functionalities, a viewing usage data service can allow raw viewing usage data to remain resident in the STB, taking advantage of increased memory. Each STB can receive individualized programming instructions via the broadcast signal that describes to the STB how to collect and manipulate the raw data and what resulting information to report back to a centralized data mining system. The STB uses its enhanced processing ability to execute these instructions and report back the results.

A centralized data mining system may then be used to store collections of individual reports (in addition to individual raw data) which can then be further processed to generate audience usage data (e.g., summary reports).

Through the reprogramming, STBs can be instructed to collect certain new and different types of data as trends in what information is most desirable change. Further, through individualized instructions, certain subsets of STBs can be instructed to report results with higher frequency, allowing for "instant" audience measurement data for certain programming. Additionally, a reduction in reliance on probabilistic methods of the prior art (to apply results to a larger audience) is possible, thereby increasing the ability to reliably track viewing usage across large numbers of viewing choices. Such reliability increases advertisers' and providers' confidence in the resulting data, and subsequently increases the value of the data to them.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description reference is made to the accompanying drawings which form a part hereof and which show, by way of illustration, several embodiments of the present invention. It is understood that other embodiments may be utilized and structural changes may be made without departing from the scope of the present invention.

Video Distribution System

Figure 1B:
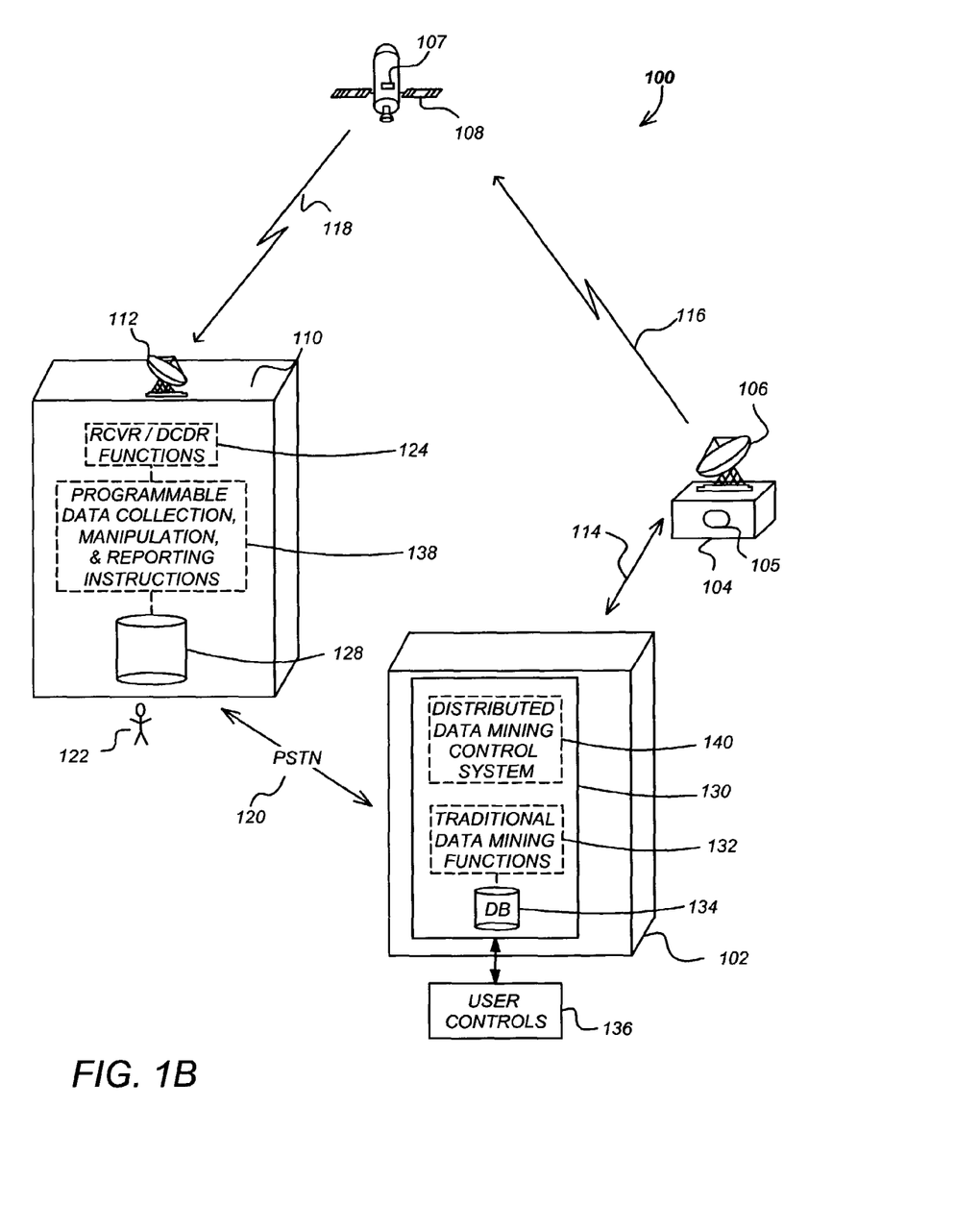
FIG. 1B depicts an overview of a sample architecture for a distributed viewing usage data service and a single video distribution system in accordance with one or more embodiments of the invention.

FIG. 1B is a diagram illustrating an overview of a distributed viewing usage data service and single satellite video distribution system (collectively referred to as video distribution system 100). Similar to FIG. 1A, the video distribution system 100 of FIG. 1B comprises a control center 102 in communication with an uplink center 104 via a ground or other link 114 and with a subscriber receiver station 110 via a public switched telephone network (PSTN) or other link 120. The control center 102 provides program material and services (e.g. video programs, audio programs, and data) to the uplink center 104 and coordinates with the subscriber receiver stations 110 to offer, for example, pay-per-view (PPV) program services, including billing and associated decryption of video programs.

The uplink center 104 receives program material, program control information, and programmable instructions (i.e., data collection instructions, data manipulation instructions, and data reporting instructions for viewing usage data) from the control center 102, and using an uplink antenna 106 and transmitter 105, transmits the program material, program control information, and programmable instructions to the satellite 108. The satellite receives and processes this information, and transmits the video programs, control information, and programmable instructions to the subscriber receiver station 110 via downlink 118 using transmitter 107. The subscriber receiving station 110 receives this information using the outdoor unit (ODU) 112, which includes a subscriber antenna and a low noise block converter (LNB).

In one embodiment, the subscriber receiving station antenna is an 18-inch slightly oval-shaped Ku-band antenna. The slight oval shape is due to the 22.5 degree offset feed of the LNB (low noise block converter) which is used to receive signals reflected from the subscriber antenna. The offset feed positions the LNB out of the way so it does not block any surface area of the antenna minimizing attenuation of the incoming microwave signal.

As in the prior art, the subscriber receiving station 110 collects individual "raw" viewing usage data. However, in the present invention, the instructions 138 for what to collect and what frequency to collect it are both pre-programmed and re-programmable. It should be noted that viewing usage data can include any data that the subscriber receiving station 110 (or STB) may be able to collect (i.e., not only data associated with the actual viewing of a program material such as television service). The new data collection instructions 138 for the subscriber receiving station 110 are received from the data mining control system 130 via the broadcast signal (i.e., via uplink 116 and downlink 118) or via link 120 from a new distributed data mining control system 140. The new distributed data mining control system 140 may be integral to the data mining system 130 or exist as a separate system with interfaces to the data mining system 130 and the uplink center 104 (also referred to as the head-end).

The new instructions 138 may be addressed to individual subscriber receiving stations 110 (or STBs) or any subset of subscriber receiving stations (or STBs) as appropriate (e.g., a geographic area or all STBs used recently to view a particular program).

The video distribution system 100 can comprise a plurality of satellites 108 in order to provide wider terrestrial coverage, to provide additional channels, or to provide additional bandwidth per channel. In one embodiment of the invention, each satellite comprises 16 transponders to receive and transmit program material and other control data from the uplink center 104 and provide it to the subscriber receiving stations 110. Using data compression, modulating, and multiplexing techniques, two satellites 108 working together can receive and broadcast over 150 conventional (non-HDTV) audio and video channels via 32 transponders.

While the invention disclosed herein will be described with reference to a satellite-based video distribution system 100, the present invention may also be practiced with terrestrial-based transmission of program information, whether by broadcasting means, cable, or other means. Further, the different functions collectively allocated among the control center 102 and the uplink center 104 as described above can be reallocated as desired without departing from the intended scope of the present invention.

Although the foregoing has been described with respect to an embodiment in which the program material delivered to the subscriber 122 is video (and audio) program material such as a movie, the foregoing method can be used to deliver program material comprising purely audio information or other data as well.

Thus, similar to the prior art of FIG. 1A, in the present invention of FIG. 1B, program material and services are sent to the subscriber receiver station 110 (and set-top box) where the viewer 122 controls the set-top box and enjoys the program materials and services (e.g., displayed on a video monitor). Details regarding the configuration of FIG. 1B are described below.

Uplink Configuration

Figure 2:
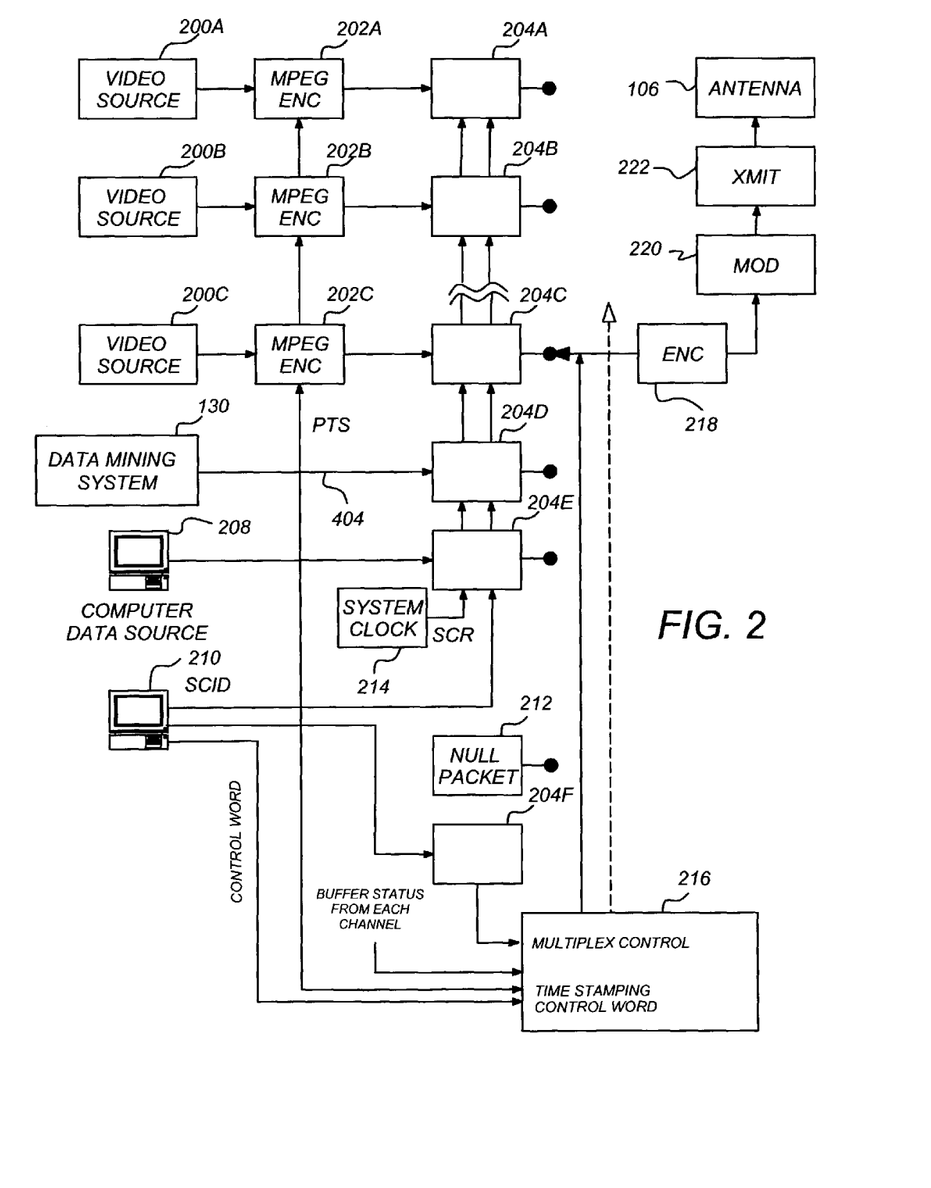
FIG. 2 is a block diagram showing a typical uplink configuration for a single satellite transponder in accordance with one or more embodiments of the invention.

FIG. 2 is a block diagram showing a typical uplink configuration for a single satellite 108 transponder, showing how video program material and new instructions 138 are uplinked to the satellite 108 by the control center 102 and the uplink center 104. FIG. 2 shows three video channels (which could be augmented respectively with one or more audio and data channels for high fidelity music, soundtrack information, or a secondary audio program for transmitting foreign languages), a data channel from the data mining system 130 and computer data information from a computer data source 208.

The video channels are provided by a program source of video material 200A-200C (collectively referred to hereinafter as video source(s) 200). The data from each video program source 200 is provided to an encoder 202A-202C (collectively referred to hereinafter as encoder(s) 202). Each of the encoders accepts a program time stamp (PTS) from the controller 216. The PTS is a wrap-around binary time stamp that is used to assure that the video information is properly synchronized with the audio information after encoding and decoding. A PTS time stamp is sent with each I-frame of the MPEG encoded data.

In one embodiment of the present invention, each encoder 202 is a second generation Motion Picture Experts Group (MPEG-2) encoder, but other decoders implementing other coding techniques can be used as well. The data channel can be subjected to a similar compression scheme by an encoder (not shown), but such compression is usually either unnecessary, or performed by computer programs in the computer data source (for example, photographic data is typically compressed into *.TIF files or *.JPG files before transmission). After encoding by the encoders 202, the signals are converted into data packets by a packetizer 204A-204F (collectively referred to hereinafter as packetizer(s) 204) associated with each source 200.

The data packets are assembled using a reference from the system clock 214 (SCR), and from the conditional access manager 210, which provides the SCID to the packetizers 204 for use in generating the data packets. These data packets are then multiplexed into serial data and transmitted.

The data stream therefore comprises a series of packets from any one of the data sources in an order determined by the controller 216. Each data packet is independently encrypted by the encryption module 218, modulated by the modulator 220 (typically using a QPSK modulation scheme), and provided to the transmitter 222, which broadcasts the modulated data stream on a frequency bandwidth to the satellite via the antenna 106. New instructions 138 may also be encrypted, but need not be.

Integrated Receiver/Decoder

Figure 3:
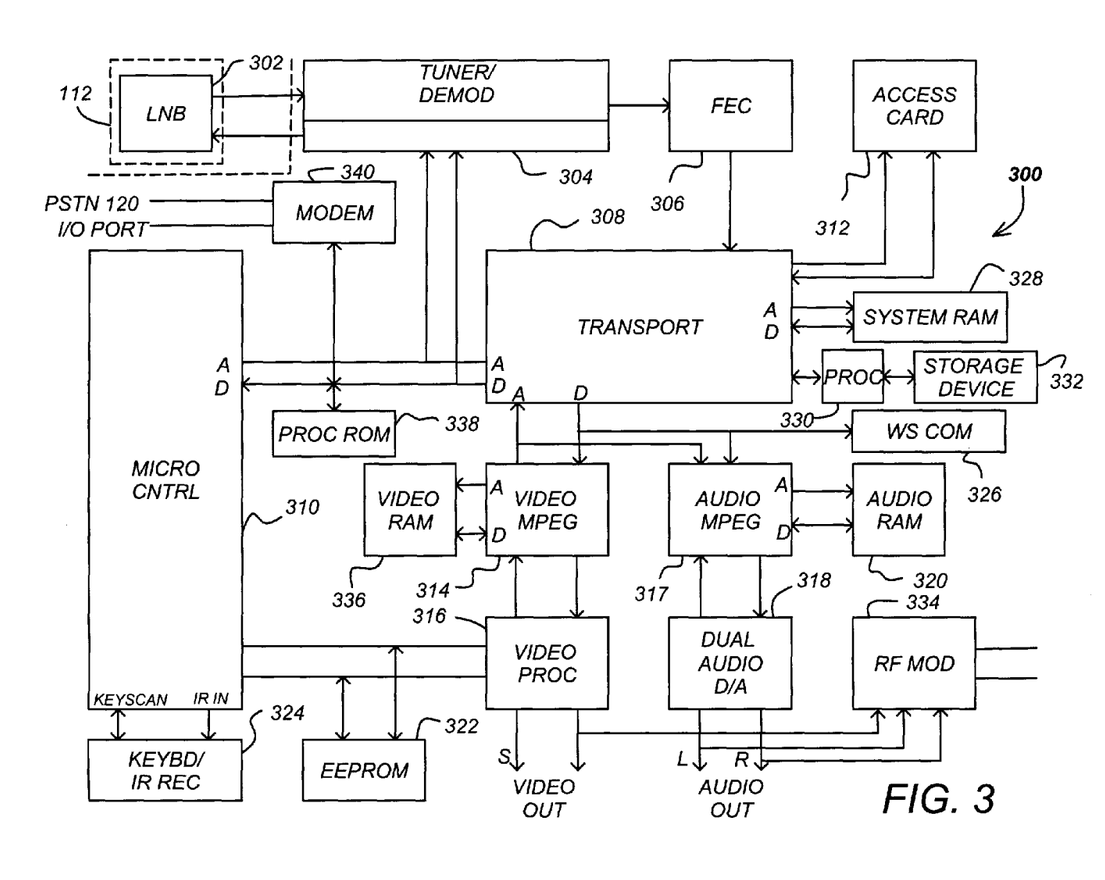
FIG. 3 is a block diagram of an integrated receiver/decoder (IRD)/set-top box in accordance with one or more embodiments of the invention.

FIG. 3 is a block diagram of an integrated receiver/decoder (IRD) 300 (also hereinafter alternatively referred to as receiver 300 or a set top box). As described above, the subscriber receiver station 110 may contain or be communicatively coupled to receiver 300. In this regard, either subscriber receiver station 110 or receiver 300 may provide the functionality for processing viewing usage data in accordance with embodiments of the invention.

The receiver 300 comprises a tuner/demodulator 304 communicatively coupled to an ODU 112 having one or more LNBs 302. The LNB 302 converts the 12.2- to 12.7 GHz downlink 118 signal from the satellites 108 to, e.g., a 950-1450 MHz signal required by the IRD's 300 tuner/demodulator 304. The LNB 302 may provide either a dual or a single output. The single-output LNB 302 has only one RF connector, while the dual output LNB 302 has two RF output connectors and can be used to feed a second tuner 304, a second receiver 300, or some other form of distribution system.

The tuner/demodulator 304 isolates a single, digitally modulated 24 MHz transponder, and converts the modulated data to a digital data stream. The digital data stream is then supplied to a forward error correction (FEC) decoder 306. This allows the IRD 300 to reassemble the data transmitted by the uplink center 104 (which applies the forward error correction to the desired signal before transmission to the subscriber receiving station 110) verifying that the correct data signal was received, and correcting errors, if any. The error-corrected data may be fed from the FEC decoder module 306 to the transport module 308 via an 8-bit parallel interface.

The transport module 308 performs many of the data processing functions performed by the IRD 300. The transport module 308 processes data received from the FEC decoder module 306 and provides the processed data to the video MPEG decoder 314 and the audio MPEG decoder 317. In one embodiment of the present invention, the transport module, video MPEG decoder and audio MPEG decoder are all implemented on integrated circuits. This design promotes both space and power efficiency, and increases the security of the functions performed within the transport module 308. The transport module 308 also provides a passage for communications between the microcontroller 310 and the video and audio MPEG decoders 314, 317. The transport module 308 may also work with the conditional access module (CAM) 312 to determine whether the subscriber receiving station 110 is permitted to access certain program material or instructions. For example, the transport module 308 may work with CAM 312 to determine if any instructions are addressed to this particular subscriber receiving station 110 or group/subset of subscriber receiving stations 110 that include this particular station 100. Data from the transport module can also be supplied to external communication module 326.

The CAM 312 functions in association with other elements to decode an encrypted signal from the transport module 308. The CAM 312 may also be used for tracking and billing these services. In one embodiment of the present invention, the CAM 312 is a smart card, having contacts cooperatively interacting with contacts in the IRD 300 to pass information. In order to implement the processing performed in the CAM 312, the IRD 300, and specifically the transport module 308 provides a clock signal to the CAM 513.

Video data is processed by the MPEG video decoder 314. Using the video random access memory (RAM) 336, the MPEG video decoder 314 decodes the compressed video data and sends it to an encoder or video processor 316, which converts the digital video information received from the video MPEG module 314 into an output signal usable by a display or other output device. By way of example, processor 316 may comprise a National TV Standards Committee (NTSC) or Advanced Television Systems Committee (ATSC) encoder. In one embodiment of the invention both S-Video and ordinary video (NTSC or ATSC) signals are provided. Other outputs may also be utilized, and are advantageous if high definition programming is processed.

Audio data is likewise decoded by the MPEG audio decoder 317. The decoded audio data may then be sent to a digital to analog (D/A) converter 318. In one embodiment of the present invention, the D/A converter 318 is a dual D/A converter, one for the right and left channels. If desired, additional channels can be added for use in surround sound processing or secondary audio programs (SAPS). In one embodiment of the invention, the dual D/A converter 318 itself separates the left and right channel information, as well as any additional channel information. Other audio formats may similarly be supported. For example, other audio formats such as multi-channel DOLBY DIGITAL AC-3 may be supported.

A description of the processes performed in the encoding and decoding of video streams, particularly with respect to MPEG and JPEG encoding/decoding, can be found in Chapter 8 of "Digital Television Fundamentals," by Michael Robin and Michel Poulin, McGraw-Hill, 1998, which is hereby incorporated by reference herein.

The microcontroller 310 receives and processes command signals from the remote control 324, an IRD 300 keyboard interface, and/or another input device. The microcontroller receives commands for performing its operations (including the instructions for data collection, data manipulation, and data reporting) from a processor programming memory. As described above, the programmable instructions 138 may be distributed via broadcast and received as described above. Alternatively, the programmable instructions may be sent individually via a 2-way data transfer network.

These instructions 138 may be both pre-programmed and re-programmable for use by the microcontroller 310. Through the ability to reprogram, the IRD 300 can be instructed to collect certain new and different types of data as trends in what information is most desirable change. Further, through the ability to program instructions 138 to particular IRDs 300 (or subscriber receiving stations 110) (i.e., individualized instructions), certain subsets of IRDs 300 (or subscriber receiving stations 110) can be instructed to report results with higher frequency, allowing for "instant" audience measurement data for certain programming. Due to the invention's utilization of the re-programmability of the instructions 138, IRDs 300 utilized should be capable of reprogramming via a software download (e.g., advanced program guide (APG) and WINK™-enabled receivers) and in particular, receivers with hard disk drives (such as in TIVO™ and ULTIMATE TV™). In this regard, existing IRDs 300 that are already used in the field (and paid for) can be used, so long as the requirements (as described herein) for memory, processing performance, and re-programmability are met.

Further, the data collection, data manipulation, and data reporting instructions 138 can be provided to IRD 300 in distinct instructions to allow full flexibility on the part of the distributor (e.g., the uplink center 102) in managing the resources of each component of the architecture appropriately. At the same time, the instructions 138 may be formatted or combined to allow efficiencies in their delivery to IRD 300 as dictated by the particular distribution network. The processor programming memory that stores the programmable instructions 138 may comprise an electrically erasable programmable read only memory (EEPROM) 322, standard memory device (e.g., hard disk drive), or similar memory device (e.g., database memory 128 of FIG. 1B). The microcontroller 310 also controls the other digital devices of the IRD 300 via address and data lines (denoted "A" and "D" respectively, in FIG. 3).

The programmable data collection instructions provide for collecting/obtaining "raw" viewing usage data. Such usage data may include command signals from remote control 324, IRD 300 keyboard interface, and/or other input device. Additionally, such raw data may include a listing of the programming material viewed, recorded (e.g. using a digital video recorder (DVR) or video cassette recorder (VCR)), selected for future recording, or indications regarding preferences of the viewer (programming or otherwise). In other words, the viewing usage data can include any data that the IRD 300 is able to collect (including data that is not associated with the viewing of a programming material).

Once collected, the programmable instructions 138 may instruct the microcontroller 310 how to manipulate the raw data. Such data manipulation may provide the ability for the microcontroller 310 (and the IRD 300) to summarize or evaluate the data. Further, such manipulation may provide for producing a report. For example, the manipulation may summarize viewing habits and programming preferences, and produce a report of the summary.

The modem 340 connects to the customer's phone line via the PSTN port 120. It calls (e.g. the program provider), and transmits the appropriate information. For example, the reporting programmable instructions 138 may provide for the transmission via modem 340 of particular resulting information (e.g., a summary report produced by microcontroller 310 and/or raw data collected) to a data mining system 130. The modem 340 is controlled by the microprocessor 310. The modem 340 can output data to other I/O port types including standard parallel and serial computer I/O ports. Thus, each IRD 300 manipulates the raw data and sends individualized pre-processed reports to the data mining system 130 (e.g., a centralized data mining system) reducing centralized processing requirements. Further, depending on the programmable data reporting instructions 138, raw data may remain resident solely in the IRD 300, reducing the cost of (1) transporting the data, and (2) storing the raw data on a central data-mining system (i.e., database 134 of FIG. 1A).

The present invention also comprises a local storage unit such as the storage device 332 for storing collected/manipulated data, or video and/or audio data obtained from the transport module 308. Storage device 332 can be a hard disk drive, a read/writable compact disc of DVD, a solid state RAM, or any other storage medium. In one embodiment of the present invention, the storage device 332 is a hard disk drive with specialized parallel read/write capability so that data may be read from the video storage device 332 and written to the device 332 at the same time. To accomplish this feat, additional buffer memory accessible by the storage 332 or its controller may be used. Optionally, a storage processor 330 can be used to manage the storage and retrieval of the data from the storage device 332. The storage processor 330 may also comprise memory for buffering data passing into and out of the storage device 332. Alternatively or in combination with the foregoing, a plurality of storage devices 332 can be used. Also alternatively or in combination with the foregoing, the microcontroller 310 can also perform the operations required to store and or retrieve the programmable instructions 138, video and other data in the storage device 332.

The video processing module 316 input can be directly supplied as a video output to a viewing device such as a video or computer monitor. In addition, the video and/or audio outputs can be supplied to an RF modulator 334 to produce an RF output and/or 8 vestigal side band (VSB) suitable as an input signal to a conventional television tuner. This allows the receiver 300 to operate with televisions without a video output.

Each of the satellites 108 comprises a transponder, which accepts program information from the uplink center 104, and relays this information to the subscriber receiving station 110. Known multiplexing techniques are used so that multiple channels can be provided to the user. These multiplexing techniques include, by way of example, various statistical or other time domain multiplexing techniques and polarization multiplexing. In one embodiment of the invention, a single transponder operating at a single frequency band carries a plurality of channels identified by respective service channel identification (SCID).

The IRD 300 may also receive and store a program guide in a memory available to the microcontroller 310. Typically, the program guide is received in one or more data packets in the data stream from the satellite 108. The program guide can be accessed and searched by the execution of suitable operation steps implemented by the microcontroller 310 and stored in the processor ROM 338. The program guide may include data to map viewer channel numbers to satellite transponders and service channel identifications (SCIDs), and also provide TV program listing information to the subscriber 122 identifying program events.

The functionality implemented in the IRD 300 depicted in FIG. 3 can be implemented by one or more hardware modules, one or more software modules defining instructions performed by a processor, or a combination of both.

Data Mining System

Figure 4:
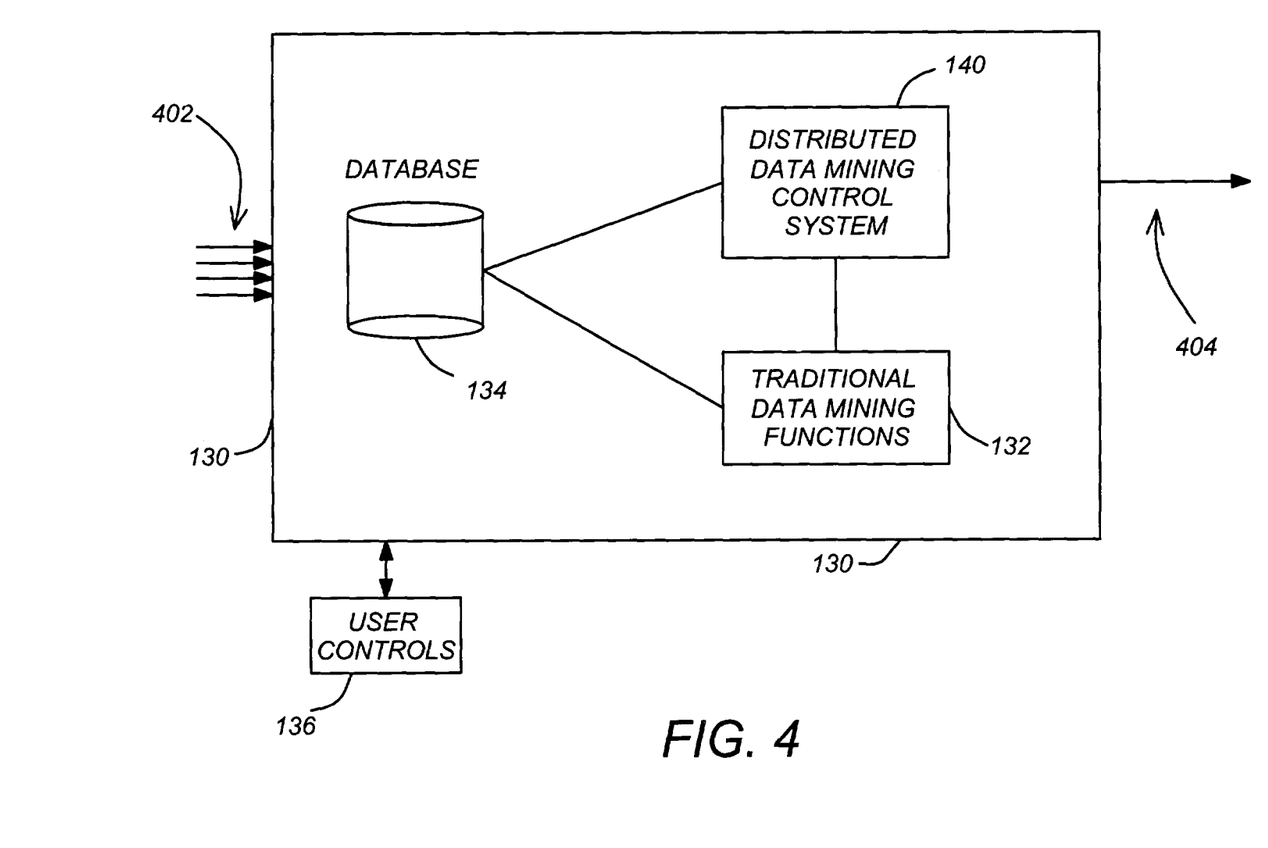
FIG. 4 is a block diagram of the distributed data mining system in accordance with one or more embodiments of the invention.

FIG. 4 is a block diagram of the data mining system 130 (also referred to as a centralized data mining system) in accordance with one or more embodiments of the invention. The data mining system 130 includes a database 134, a distributing data mining control system 140, traditional data mining functions 132, and user controls 136.

Data transfer feeds 402 provide electronic reporting information from the various subscriber receiving stations 110. As described above, such reporting information may comprise a summary report and/or raw data collected by an IRD 300. The reporting information is typically transmitted over telephone lines (e.g., PSTN 120) to database 134. Database 134 is a computer-based system that receives data from feeds 402 and store collections of individual reports (in addition to individual raw data requested).

Once the individual reports have been received, the data mining system 130 (i.e., using traditional or modified data mining functions 132) may be used to generate final reports. Staff/personnel responsible for viewing usage reporting data may operate the data mining system 130 (including the distributed data mining control system 140) through user control terminals 136. This staff provides data manipulation and reporting instructions to the data mining system 130, which then generates the required audience usage reports.

The same staff may also desire to modify the data collection, manipulation, and reporting instructions performed by the IRD 300. To accomplish this task, the staff may provide the data collection, manipulation, and reporting instructions to the subscriber receiving stations 110 (and IRD 300) via the distributed data mining control system 140. Such distribution of the programmable instructions to the subscriber receiving stations 110 are output 404 to uplink center 104 for broadcasting via satellite 108.

These programming instructions may be transmitted at varying intervals depending on the mechanisms utilized to implement the broadcast. For example, the programming instructions may be transmitted every second, every 5 seconds, or every hour (or a combination thereof). However, since the subscriber's receivers may not always be on and receiving and saving the instructions, the programmable instructions 138 may also be continuously re-transmitted. It is noted that the uplink configuration depicted in FIG. 2 and the data mining system 130 depicted in FIG. 3 can be implemented by one or more hardware modules, one or more software modules defining instructions performed by a processor, or a combination of both.

Logical Flow

Figure 5:
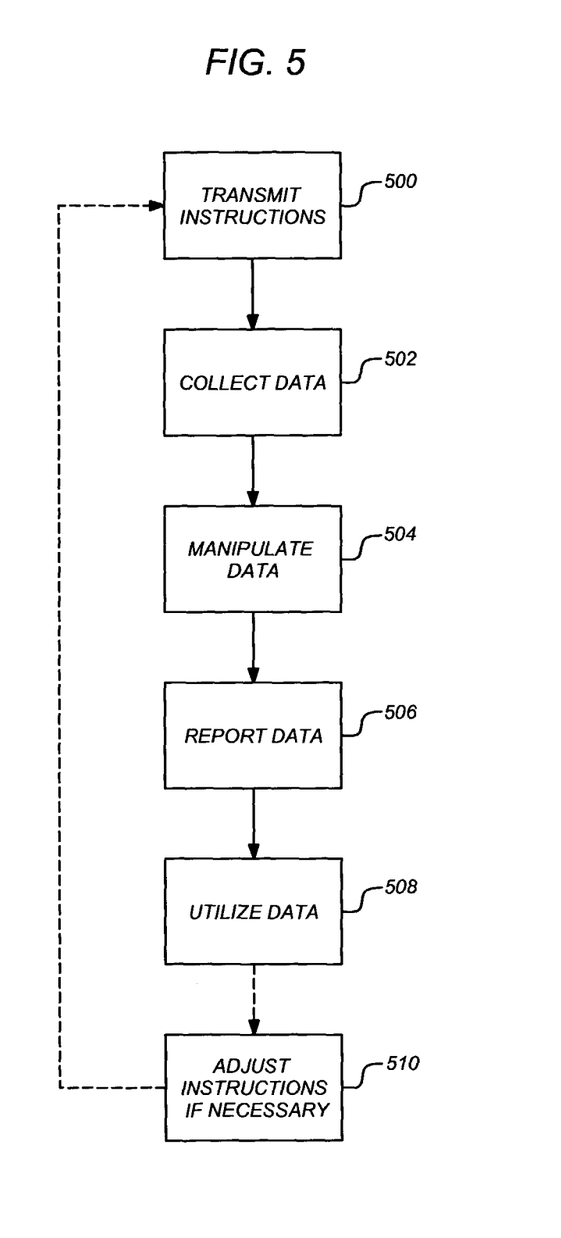
FIG. 5 is a flow chart illustrating the processing of viewing usage data in accordance with one or more embodiments of the invention.

FIG. 5 is a flow chart illustrating the processing of viewing usage data in accordance with one or more embodiments of the invention. At step 500, programmable data collection, data manipulation, and data reporting instructions are transmitted from a data mining system 130 (i.e., through distributed data mining control system 140). As described above, such a transmission may be broadcast via satellite 108 or via terrestrial based lines to one or more individual set-top boxes 300 or a group/subset of set-top boxes 300.

At step 502, raw viewing usage data is obtained/collected in a set-top box 300 in accordance with the instructions. Such raw viewing usage data may include any data that the set-top box can or is capable of collecting. At step 504, the raw viewing usage data is manipulated in the set-top box 300 to create a report in accordance with the instructions. At step 506, the report is transmitted from the set-top box 300 to a centralized data mining system 130 in accordance with the reporting instructions. The raw usage data may remain resident in the set-top box 300 subsequent to transmitting the report (e.g., for use in creating later reports) or may be transmitted simultaneously with (or separately from) the report.

The data may then be further manipulated and/or used in the centralized data mining system 130 at step 508. Thereafter, the process may be complete. However, the data mining system may also adjust the programmable instructions if necessary at step 510, and the process then continues at step 500.

Conclusion

This concludes the description of one or more embodiments of the present invention. The foregoing description of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of processing viewing usage data in a set-top box comprising:
   receiving, in a set-top box, via broadcast, distinct programmable instructions for data collection, data manipulation, and data reporting for viewing usage data;
   collecting and persistently storing, in the set-top box, raw viewing usage data in accordance with the instructions for data collection;
   manipulating, in the set-top box, the raw viewing usage data to create a report in accordance with the instructions for data manipulation, wherein the report is stored persistently in the set-top box; and
   transmitting the report from the set-top box to a centralized data mining system in accordance with the instructions for data reporting.

2. The method of claim 1, wherein the distinct programmable instructions are addressed to one or more individual set-top boxes.

3. The method of claim 1, wherein the distinct programmable instructions are addressed to a subset of set-top boxes.

4. The method of claim 1, wherein the raw viewing usage data includes any data that the set-top box can collect.

5. The method of claim 1, wherein the programmable instructions are received from a distributed data mining control system.

6. The method of claim 1, wherein the raw viewing usage data remains resident in the set-top box subsequent to the transmitting.

7. The method of claim 1, further comprising transmitting the raw viewing usage data, from the set-top box to the centralized data mining system in accordance with the instructions for data reporting.

8. The method of claim 1, further comprising receiving, in the set-top box, interesting programming and advertisements based on the report.

9. A set-top box comprising:
(a) a memory;
(b) instructions, received via broadcast, that are stored in the memory, wherein the instructions comprise distinct programmable instructions for data collection, data manipulation, and data reporting for viewing usage data;
(c) a microprocessor communicatively coupled to the memory, wherein the microprocessor is configured to:
   (i) collect and persistently store raw viewing usage data in accordance with the instructions for data collection;
   (ii) manipulate the raw viewing usage data to create a report in accordance with the instructions for data manipulation, wherein the report is stored persistently in the set-top box; and
   (iii) transmit the report from the set-top box to a centralized data mining system in accordance with the instructions for data reporting.

10. The set-top box of claim 9, wherein the distinct programmable instructions are addressed to one or more individual set-top boxes.

11. The set-top box of claim 9, wherein the distinct programmable instructions are addressed to a subset of set-top boxes.

12. The set-top box of claim 9, wherein the raw viewing usage data includes any data that the set-top box can collect.

13. The set-top box of claim 9, wherein the programmable instructions are received from a distributed data mining control system.

14. The set-top box of claim 9, wherein the raw viewing usage data remains resident in the set-top box subsequent to the transmitting.

15. The set-top box of claim 9, wherein the microprocessor is further configured to transmit the raw viewing usage data, from the set-top box to the centralized data mining system in accordance with the instructions for data reporting.

16. The set-top box of claim 9, wherein the microprocessor is further configured to receive interesting programming and advertisements based on the report.

17. An article of manufacture for processing viewing usage data in a set-top box comprising:
means for receiving, in a set-top box, via broadcast, distinct programmable instructions for data collection, data manipulation, and data reporting for viewing usage data;
means for collecting and persistently storing, in the set-top box, raw viewing usage data in accordance with the instructions for data collection;
means for manipulating, in the set-top box, the raw viewing usage data to create a report in accordance with the instructions for data manipulation, wherein the report is stored persistently in the set-top box; and
means for transmitting the report from the set-top box to a centralized data mining system in accordance with the instructions for data reporting.

18. The article of manufacture of claim 17, wherein the distinct programmable instructions are addressed to one or more individual set-top boxes.

19. The article of manufacture of claim 17, wherein the distinct programmable instructions are addressed to a subset of set-top boxes.

20. The article of manufacture of claim 17, wherein the raw viewing usage data includes any data that the set-top box can collect.

21. The article of manufacture of claim 17, wherein the programmable instructions are received from a distributed data mining control system.

22. The article of manufacture of claim 17, wherein the raw viewing usage data remains resident in the set-top box subsequent to the transmitting.

23. The article of manufacture of claim 17, further comprising means for transmitting the raw viewing usage data, from the set-top box to the centralized data mining system in accordance with the instructions for data reporting.

24. The article of manufacture of claim 17, further comprising means for receiving, in the set-top box, interesting programming and advertisements based on the report.

* * * * *